US011823674B2

(12) United States Patent
Furman et al.

(10) Patent No.: US 11,823,674 B2
(45) Date of Patent: Nov. 21, 2023

(54) SYSTEM AND METHOD OF DEPLOYING A VIRTUAL ASSISTANT AT AN ELECTRONIC MEDIA DEVICE FOR OBTAINING INFORMATION RELATED TO A PUBLIC-SAFETY INCIDENT

(71) Applicants: Piotr Furman, Grojec (PL); Grzegorz Gustof, Myslenice (PL); Jakub Warzocha, Sandomierz (PL); MOTOROLA SOLUTIONS, INC., Chicago, IL (US)

(72) Inventors: Piotr Furman, Grojec (PL); Grzegorz Gustof, Myslenice (PL); Jakub Warzocha, Sandomierz (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 276 days.

(21) Appl. No.: 17/310,722

(22) PCT Filed: Apr. 25, 2019

(86) PCT No.: PCT/PL2019/050024
§ 371 (c)(1),
(2) Date: Aug. 19, 2021

(87) PCT Pub. No.: WO2020/218928
PCT Pub. Date: Oct. 29, 2020

(65) Prior Publication Data
US 2022/0319508 A1    Oct. 6, 2022

(51) Int. Cl.
G10L 15/22     (2006.01)
G06F 40/30     (2020.01)
(Continued)

(52) U.S. Cl.
CPC .............. G10L 15/22 (2013.01); G06F 40/30 (2020.01); G06Q 50/265 (2013.01); H04L 67/52 (2022.05);
(Continued)

(58) Field of Classification Search
CPC ......... G10L 15/22; G10L 15/30; G10L 25/48; G10L 15/26; G10L 2015/223;
(Continued)

(56) References Cited

U.S. PATENT DOCUMENTS 5,864,764 A    1/1999  Thro et al.
7,054,747 B2   5/2006  Ruelke et al.
(Continued)

OTHER PUBLICATIONS

The International Search Report and The Written Opinion corresponding patent application No. PCT/PL2019/050024, filed: Apr. 25, 2019, all pages.

*Primary Examiner* — Mark Villena
(74) *Attorney, Agent, or Firm* — Raguraman Kumaresan

(57) ABSTRACT

A process of deploying a virtual assistant at an electronic media device to obtain information related to a public-safety incident. An electronic computing device captures a real-time digital audio and/or video stream from a first user under interrogation in relation to the incident and further processes the captured stream to determine that a second user has potential information related to the incident. The electronic computing device then determines that a virtual assistant is not currently deployed at an electronic media device that is identified as positioned at a current location of the second user. When it is determined that the electronic media device is capable of hosting a virtual assistant, the electronic computing device transmits an instruction to deploy a virtual assistant at the electronic media device and further perform an interrogation of the second user to obtain information
(Continued)

related to the public-safety incident via the deployed virtual assistant.

20 Claims, 3 Drawing Sheets

(51) Int. Cl.
    *H04L 67/52*     (2022.01)
    *G06Q 50/26*     (2012.01)

(52) U.S. Cl.
    CPC .. *G10L 2015/223* (2013.01); *G10L 2015/225* (2013.01)

(58) Field of Classification Search
    CPC ... G10L 2015/225; G06F 21/32; G06F 40/30; H04L 67/52; G06Q 50/265
    See application file for complete search history.

(56) References Cited

U.S. PATENT DOCUMENTS

| | | |
|---|---|---|
| 7,774,292 B2 | 8/2010 | Brennan et al. |
| 7,881,737 B2 | 2/2011 | Klein |
| 8,019,278 B2 | 9/2011 | Baraz et al. |
| 8,140,715 B2 | 3/2012 | Liu et al. |
| 9,276,802 B2 | 3/2016 | Lynch et al. |
| 9,804,820 B2 | 10/2017 | Quast et al. |
| 10,455,372 B2 | 10/2019 | Trzupek et al. |
| 10,540,883 B1 * | 1/2020 | Keil ................. G10L 25/51 |
| 10,742,939 B1 * | 8/2020 | Sommerlatt ..... G06Q 20/40145 |
| 10,880,672 B2 * | 12/2020 | Barone ................. G06Q 50/26 |
| 10,943,463 B1 * | 3/2021 | Clark ................. G08B 21/0438 |
| 2005/0125370 A1 | 6/2005 | Brennan et al. |
| 2006/0190554 A1 | 8/2006 | Franz et al. |
| 2014/0164476 A1 | 6/2014 | Thomson |
| 2014/0164508 A1 | 6/2014 | Lynch et al. |
| 2014/0244712 A1 | 8/2014 | Walters et al. |
| 2015/0066817 A1 | 3/2015 | Slayton et al. |
| 2015/0172262 A1 | 6/2015 | Ortiz, Jr. et al. |
| 2015/0186156 A1 | 7/2015 | Brown et al. |
| 2015/0382079 A1 | 12/2015 | Lister et al. |
| 2016/0093304 A1 | 3/2016 | Kim et al. |
| 2017/0017501 A1 | 1/2017 | Quast |
| 2018/0278504 A1 | 9/2018 | Alazraki et al. |
| 2021/0385638 A1 * | 12/2021 | Stawiszynski ........ H04W 76/50 |

\* cited by examiner

SYSTEM AND METHOD OF DEPLOYING A VIRTUAL ASSISTANT AT AN ELECTRONIC MEDIA DEVICE FOR OBTAINING INFORMATION RELATED TO A PUBLIC-SAFETY INCIDENT

BACKGROUND OF THE INVENTION

Tablets, laptops, phones (for example, cellular or satellite), mobile (vehicular) or portable (personal) two-way radios, and other communication devices are now in common use by users, and provide users with instant access to increasingly valuable information and resources that may aid the user in making a more informed determination of an action to take or how to resolve a situation, among other possibilities. Many such communication devices further comprise, or provide access to, electronic digital assistants that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
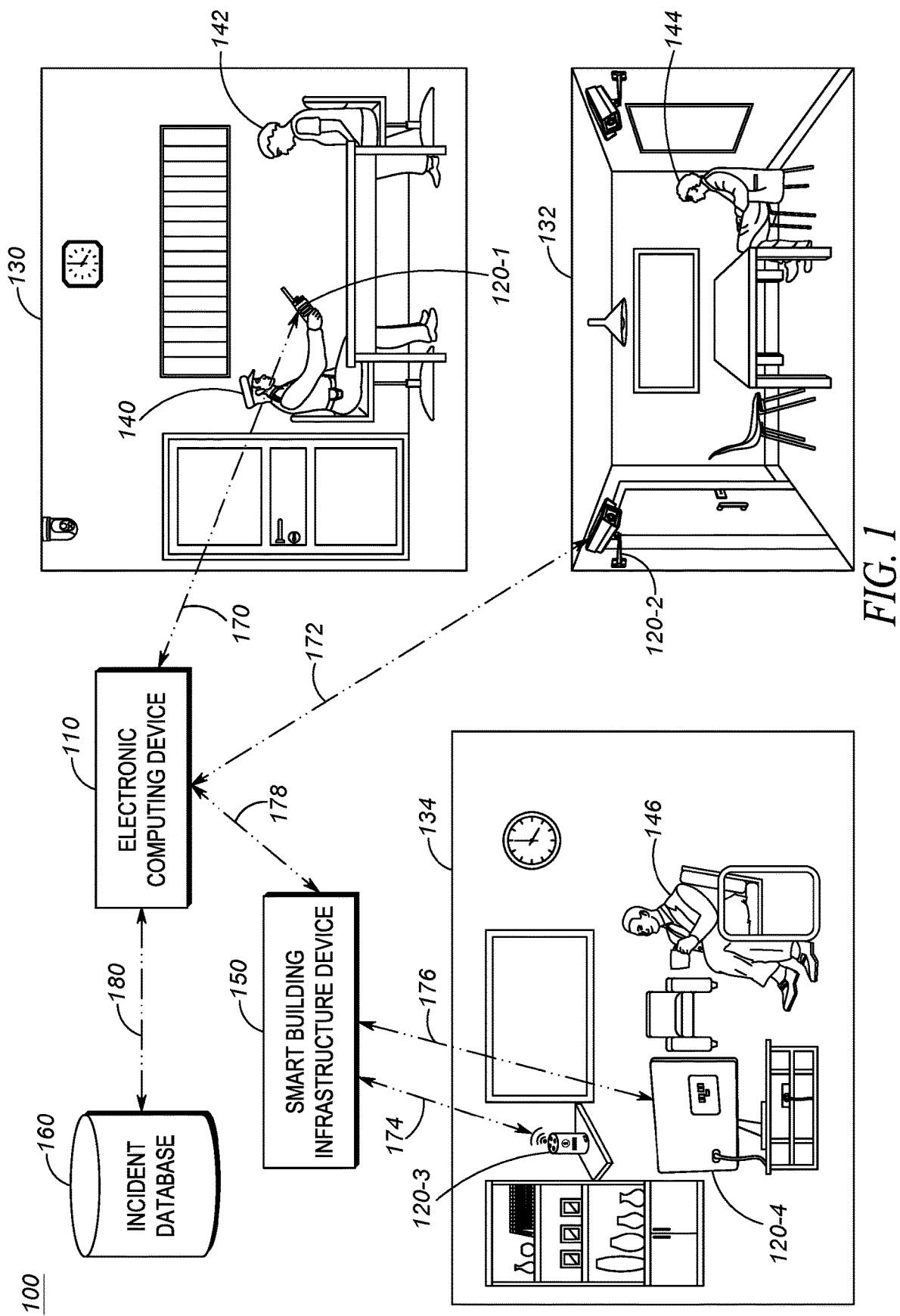
FIG. 1 is a system diagram illustrating a system of deploying a virtual assistant at an electronic media device for obtaining information related to a public-safety incident in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel regularly perform an information gathering function that may take the form of an informal conversation or a formal interview (i.e., when questions are posed by voice to an interviewee and generally referred to hereinafter as an interrogation) at a government building, at an interviewee's car or house, or at some other location. The information gathering function may be performed by public safety personnel to obtain information related to an incident. For example, public safety personnel such as police officers may interview a witness to identify a suspect. Officers often learn new information during such conversations/interviews and this may lead to officers travelling to other locations to follow up with new witnesses to corroborate the information obtained during the previous interviews or to obtain additional information related to the incident. However, it may not be always feasible for officers to immediately end the current conversation or interview in order to conduct an interview with another person located at a different location. Further, in some cases, it is possible that the officers may need to travel to a potentially hostile area to interview a witness.

Virtual assistants can be advantageously deployed in such situations to address the above-mentioned issues associated with interviewing a witness. As used herein, the term "virtual assistant" refers to electronic digital assistants (or sometimes referenced as "virtual partners") implemented at computing devices that may provide the user thereof with valuable information in an automated (for example, without further user input) or semi-automated (for example, with some further user input) fashion. The valuable information provided to the user may be based on explicit requests for such information posed by the user via an input (for example, such as a parsed unstructured natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

Virtual assistants can be deployed to proactively or reactively provide valuable information to officers during their information gathering function. For example, when the virtual assistant is deployed at officer's radio, the virtual assistant may be enabled during the officer's interview with an interviewee to perform one or more of: monitoring conversations exchanged between the officer and interviewee, generating and storing report based on the conversations exchanged between the officer and interviewee, sharing incident-related information captured from interviewee's responses in real-time to other users (e.g., to others officers in the same talk group), and alerting the officer in case of an approaching threat and/or an unexpected behavior from the interviewee, etc. Virtual assistants can also be additionally enabled during such interviews, for example, by either pre-deploying or dynamically deploying the virtual assistant at one or more electronic media devices placed in the interview room, to autonomously pose queries to the interviewee and/or to process the responses (that are often received and processed as an unstructured natural language user input) captured from the interviewee. In some situations, when the virtual assistant learns information related to a second person during an interview with a first person and further when there is a need to immediately establish a contact with the second person (e.g., to verify information provided by the first person and/or to obtain new information about the incident) without human intervention, a virtual assistant can also be enabled at the current location of the second person to perform interrogation of the second person without human intervention and further share the information captured by the virtual assistant from the second person with the virtual assistant deployed at the first person's location and/or the interviewer. However, it is possible that there are no virtual assistants that are currently deployed at the second person's location or alternatively it is possible that the virtual assistant deployed at the second person's location (e.g., at second person's electronic media device such as a smart phone) is not currently configured to pose queries to and/or process responses captured from the second person. In addition, in order to autonomously interview the second person at the second location, it is important to configure a virtual-assistant enabled electronic media device at the second person's location with proper incident context to allow the virtual assistant at the second person's location to pose queries related to the current incident. Further, there may be security and/or privacy concerns with respect to exchanging public-safety incident information between a virtual assistant that is enabled at an officer's device (e.g., operating via a secure public-safety agency network) and a virtual assistant that may be enabled at a civilian device (e.g., operating via a private cellular network) that is located at second person's device. Accordingly, there is a technological need to readily deploy virtual assistants at new locations when there is a need to securely obtain information related to a public-safety incident.

One embodiment provides a method of deploying a virtual assistant at an electronic media device for obtaining information related to a public-safety incident. The method includes: capturing, at an electronic computing device, via an audio and/or video capture device, a real-time digital audio and/or video stream from a first user under interrogation in relation to a public-safety incident; determining, at the electronic computing device, based on processing the real-time digital audio and/or video stream captured from the first user, that a second user has potential information related to the public-safety incident; determining, at the electronic computing device, a current location of the second user; identifying, at the electronic computing device, an electronic media device that is positioned at the current location of the second user; determining, at the electronic computing device, whether a virtual assistant is currently deployed at the electronic media device; responsive to determining that a virtual assistant is not currently deployed at the electronic media device, determining, at the electronic computing device, whether the electronic media device is capable of hosting a virtual assistant; and responsive to determining that the electronic media device is capable of hosting a virtual assistant, transmitting, at the electronic computing device, an instruction to deploy a virtual assistant at the electronic media device and further perform an interrogation of the second user to obtain information related to the public-safety incident from the second user via the deployed virtual assistant.

A further embodiment provides an electronic processing system for deploying a virtual assistant at an electronic media device for obtaining information related to a public-safety incident. The electronic processing system includes an audio and/or video capture device; a transceiver; one or more electronic processors communicatively coupled to the audio and/or video capture device and the transceiver. The one or more electronic processors are configured to: capture, via the audio and/or video capture device, a real-time digital audio and/or video stream from a first user under interrogation in relation to a public-safety incident; determine, based on processing the real-time digital audio and/or video stream captured from the first user, that a second user has potential information related to the public-safety incident; determine a current location of the second user; identify an electronic media device that is positioned at the current location of the second user; determine, at the electronic computing device, whether a virtual assistant is currently deployed at the electronic media device; when it is determined that a virtual assistant is not currently deployed at the electronic media device, determine, at the electronic computing device, whether the electronic media device is capable of hosting a virtual assistant; and when it is determined that the electronic media device is capable of hosting a virtual assistant, transmit, via the transceiver, an instruction to deploy a virtual assistant at the electronic media device and further perform an interrogation of the second user to obtain information related to the public-safety incident from the second user via the deployed virtual assistant.

Each of the above-mentioned embodiments will be discussed in more detail below, starting with example system and device architectures of the system in which the embodiments may be practiced, followed by an illustration of processing steps for achieving the method of deploying a virtual assistant at an electronic media device for obtaining information related to a public-safety incident. Further advantages and features consistent with this disclosure will be set forth in the following detailed description, with reference to the figures.

Referring now to the drawings, and in particular FIG. 1, which depicts a schematic view of a system 100 including an electronic computing device 110 that is configured to deploy a virtual assistant at one or more electronic media devices 120 for the purpose of obtaining information related to a public-safety incident. The electronic media devices 120 include, but are not limited to, televisions, cameras, speakers, laptops, mobile tablets, computers, smart phones, display devices, microphones, network devices, radios, remote speaker microphones, or any combination of one or more electronic devices that are capable of receiving, processing, and/or delivering media to a user. For illustrative purposes, an example scenario is shown in FIG. 1 with an electronic media device 120-1 such as a radio communication device that is positioned at a first location 130. For example, the radio communication device may be worn or carried by a user such as a public-safety officer 140 (also referred herein as interviewer), who may be assigned to watch and/or interview a user 142 located at the first location 130. The first location 130 may correspond to an indoor location, for example, an interviewing room housed in a public-safety agency (e.g., police department) building. The user 142 (also referred herein as interviewee) may be a witness or a potential suspect under interrogation in relation to a public-safety incident (e.g., a fire incident, a theft incident, a car accident, a drug trafficking incident etc.).

An electronic media device 120-2 is shown as a surveillance camera that is positioned at a second location 132 in which a user 144 is located. In the example shown in FIG. 1, the second location 132 may correspond to another indoor location, for example, a different room housed in the same or different public-safety department building. The user 144 may be a witness, a potential suspect, or a person who has been arrested and kept in custody of the public-safety agency department in connection with the same public-safety incident for which the user 142 is being questioned or alternatively for a different public-safety incident. The user 144 may alternatively be a subject matter expert, for example, a chemist who may be requested to provide information about a chemical substance mentioned by the user 142 during interrogation. In accordance with some embodiments, the user 144 may be identified by the electronic computing device 110 as a person possessing potential information related to the public-safety incident for which the user 142 is being interrogated at the first location 130.

Electronic media devices 120-3 and 120-4 are positioned at a third location 134 (e.g., a room in a civilian apartment building) in which a user 146 is located. For example, the electronic media device 120-3 is shown as a smart speaker (e.g., an integrated speaker and microphone that is enabled to respond to user queries) and the electronic media device 120-4 is shown as a television. In accordance with some embodiments, the user 146 may be identified by the electronic computing device 110 as a person (e.g., a witness to the incident or a subject matter expert) possessing potential information related to the public-safety incident for which the user 142 and/or user 144 are being interrogated at the respective first and second locations 130, 132.

In accordance with embodiments, the electronic computing device 110 is a device that is authorized (e.g., by a public-safety agency such as a police department) and further configured to dynamically deploy virtual assistants at one or more of the electronic media devices 120 shown in FIG. 1. Although only three locations are shown in FIG. 1, the environment in which the system 100 is operated may include any number of locations having any number of electronic media devices 120 at which the electronic computing device 110 is capable of deploying virtual assistants to obtain information related to any number of public-safety incidents in accordance with the disclosure. The electronic computing device 110 may be implemented as a stand-alone electronic device or integrated at one or more authorized electronic media devices 120, for example, electronic media device 120-1 (i.e., radio communication device operated by the officer 140) and/or electronic media device 120-2 (i.e., surveillance camera positioned at the second location 132) that are associated with the public-safety agency. The electronic computing device 110 may be operating within a communication network (not shown) that is controlled and operated by a public-safety agency (e.g., police department) to facilitate secure communication between the electronic computing device 110, electronic media devices 120, smart building infrastructure device 150 and the incident database 160. Wired or wireless air-interface communication links 170, 172, 178, and 180 communicatively couple the electronic computing device 110 with electronic media device 120-1, electronic media device 120-2, smart building infrastructure device 150, and incident database 160, respectively via a communication network (not shown). The communication network may include a wired or wireless network, or a combination of wired and wireless networks, or any public safety network (e.g., land mobile radio (LMR) network, long-term evolution (LTE) network, etc.,) operated by a government or private organization.

In accordance with some embodiments, the electronic computing device 110 processes real-time digital audio and/or video stream captured from a user to determine if there is a need to deploy virtual assistant at a remote location. For example, the radio communication device (e.g., using an audio and/or video capture device component integrated with the radio communication device) positioned at the first location 130, is used for capturing real-time digital audio and/or video of a field-of-view associated with the user 142 under interrogation in relation to a public-safety incident, perhaps including the first user surroundings, and further for transmitting the captured audio and/or video in real-time to the electronic computing device 110 for further analysis. Similarly, the surveillance camera positioned at the second location 132 may be used to capture audio and/or video of a field-of-view associated with the user 144 in relation to a public-safety incident, perhaps including the second user surroundings, and further for transmitting the captured audio and/or video in real-time to the electronic computing device 110 for further analysis. The captured real-time digital audio and/or video stream from the users 142, 144 and/or officer 140 is then processed/analyzed by the electronic computing device 110 in accordance with the remainder of this disclosure to determine whether there is a need to obtain information related to the public-safety incident from an additional user and accordingly deploy a virtual assistant at an electronic media device 120 positioned at a remote location in which the additional user may be currently located. In the scenario shown in FIG. 1, the electronic computing device 110 determines, based on the analysis of the audio and/or video stream captured from the user 142, that a second user such as the user 144 located at the second location 132 and/or a third user such as the user 146 located at the third location 134 need to be interrogated in relation to the public-safety incident. In accordance with the remainder of this disclosure, the electronic computing device 110 initiates a procedure for deploying a new virtual assistant at one or more electronic media devices 120 (e.g., electronic media devices 120-2, 120-3, and/or 120-4) that are respectively positioned at the second or third locations 132, 134 at which additional users are currently located.

In one embodiment, a virtual assistant may be deployed by the electronic computing device 110 at one or more authorized electronic media devices 120 (e.g., radio communication device, the surveillance camera, etc.,) to assist the interviewer (e.g., officer 140) with interrogation of the interviewee (e.g., user 142 and/or user 144) in relation to a public-safety incident. A virtual assistant is referred herein as a deployed virtual assistant when an electronic media device such as the electronic media device 120-1 is currently hosting a virtual assistant. An electronic media device 120 with a deployed virtual assistant includes an installed virtual-assistant application that is further configured with security credentials (e.g., security certificates and authentication keys needed to connect to one or more of incident database 160, smart building infrastructure device 150, and other electronic media devices 120) and further incident context information (or is able to connect to incident database 160 to extract incident context information using the security credentials) to proactively or reactively (for example, in response to a request from the interviewer) pose a query in connection with a public-safety incident to a interviewee, based on the relevant incident context information. A deployed virtual assistant is further capable of processing real-time digital audio and/or video stream that is captured corresponding to the verbal and/or visual response captured from the interviewee to generate queries and/or recommend an action (e.g., to ask a particular question to the user 142) to be taken by the officer 140. Additionally, or alternatively, the deployed virtual assistant may also monitor the conversations exchanged between the interviewer and interviewee to recommend questions that the officer 140 may ask the user 142 in relation to the public-safety incident or alternatively suggest to the officer 140 that the response from the user 142 includes conflicting information (for example, in comparison to information obtained from the user 144 at the second location 132 and/or incident information stored at the incident database 160) in relation to the public safety incident.

The electronic computing device 110 further includes and/or obtains access to an incident database 160 that stores information related to incidents, for example, the public-safety incident for which the user 142 and/or user 144 is being interrogated. The incident database 160 may be implemented at the electronic computing device 110 or alternatively implemented as a cloud-based storage device that is accessible to the electronic computing device 110. The incident database 160 stores text, image, or video data corresponding to a public-safety incident. The incident database 160 may also include an incident record indicating an identifier (e.g., computer aided dispatch identifier (CAD ID)) of the incident, location of the incident, type and severity level of the incident, incident priority, user profiles of officers assigned to the incident, user profiles of witnesses and suspects, and testimonies/statements of witnesses and suspects, and the like. The electronic computing device 110 is also configured to update a corresponding incident record stored at the incident database 160 based on the information obtained from the user during interrogation. In accordance with some embodiments, the electronic computing device 110 accesses information related to the public-safety incident for which the user is being interrogated to extract incident context information associated with the public safety incident. The extracted incident context information is then used by the electronic computing device 110 to enable a deployed virtual assistant (e.g., virtual assistant deployed at the electronic computing device 110 and/or the electronic media devices 120-1) to interrogate (i.e., generate questions based on the extracted incident context information) the interviewee. Similarly, the information obtained from the interviewee during interrogation can be stored at the incident database 160, which can be accessed by the electronic media devices 120-2, 120-3, 120-3 and/or the smart building infrastructure device 150 after the virtual assistant is deployed at the respective electronic media devices 120-2, 120-3, 120-4 for interviewing the respective users 144, 146 at the respective locations 132, 134.

In accordance with some embodiments, the electronic computing device 110 communicates with one or more smart building infrastructure devices 150 to deploy a virtual assistant at identified electronic media devices 120. When the electronic media devices 120 are positioned at civilian locations (e.g., electronic media devices 120-3, 120-4 positioned at location 134), the electronic computing device 110 obtains permissions from an infrastructure device before virtual assistants can be deployed at electronic media devices 120 that are managed by the infrastructure device. An infrastructure device such as a smart building infrastructure device 150 associated with a particular location/building may act as proxy server for one or more of the electronic media devices 120 that are positioned at the particular location/building. For example, the smart building infrastructure device 150 may be a device that is trusted by both the electronic computing device 110 associated with a public-safety agency as well as the electronic media devices 120-3 and 120-4 that are used in private locations. Wired or wireless air-interface communication links 174 and 176 may communicatively couple the electronic media devices 120-3 and 120-4, respectively with the smart building infrastructure device 150, via a communication network. The communication network may include a wired or wireless network, or a combination of wired and wireless networks, operated for example, by a cellular service provider. In these embodiments, the electronic computing device 110, responsive to determining a current location of a user (e.g., user 146 who may be a witness to a public-safety incident for which the user 142 is under interrogation) to obtain information related to a public-safety incident, may initiate the process of deploying a virtual assistant at the location of the user 146 by sending a message to a smart building infrastructure device 150 (e.g., via communication link 178) that is responsible for managing electronic media devices 120-3, 120-4 at the third location 134.

The message transmitted from the electronic computing device 110 to the smart building infrastructure device 150 to deploy a virtual assistant, includes one or more of: (i) information (e.g., user identity such as name, and current location) related to the user (e.g., user 146) who has been identified as possessing potential information related to the public-safety incident, (ii) incident information (e.g., incident identifier, incident type, incident location, incident severity, incident priority, interrogation priority, and the like) related to an incident for which the user 146 is to be interrogated, (iii) a request to provide and/or identify a list of electronic media devices 120 that are associated and/or positioned in proximity to user's current location (e.g., location 134 in which the user 146 is currently located), (iv) a request to provide device capability information associated with a list of electronic media devices 120 that are associated and/or positioned in proximity to the user 146 i.e., at the location 134 of the user; and (v) a request to provide permission to deploy a virtual assistant at an electronic media device 120 identified by the electronic computing device 110 or the smart building infrastructure device 150. In response to this message, the smart building infrastructure device 150 may provide one or more of the information (e.g., a list of electronic media devices 120-3, 120-4 deployed at the location 134 of the user 146 and the corresponding device capability information, a permission to deploy a virtual assistant at a particular one of the electronic media devices 120-3, 120-4, etc.,) requested by the electronic computing device 110. Based on the information received from the smart building infrastructure device 150, the electronic computing device 110 may establish a connection, via the smart building infrastructure device 150 (e.g., using communication links 174, 178), with a selected electronic media device (e.g., device 120-3 or device 120-4) that is positioned at the location of the user (e.g., user 146) to deploy a virtual assistant at the selected electronic media device 120.

In some implementations, the electronic computing device 110 may deploy virtual assistant by directly communicating with the identified electronic media device 120. For example, electronic media devices 120-1 and 120-2 are shown in FIG. 1 as already being positioned at locations 130, 132 that are associated with a public-safety agency. Further, the electronic media devices 120-1 and 120-2 may be already securely connected to a communication network that is operated by a public-safety agency with which the electronic computing device 110 is also associated. In such implementations, the electronic computing device 110 may not need to communicate with the smart building infrastructure device 150, and the electronic computing device 110 may instead directly transmit an instruction to the electronic media device 120 to deploy a virtual assistant.

Figure 2:
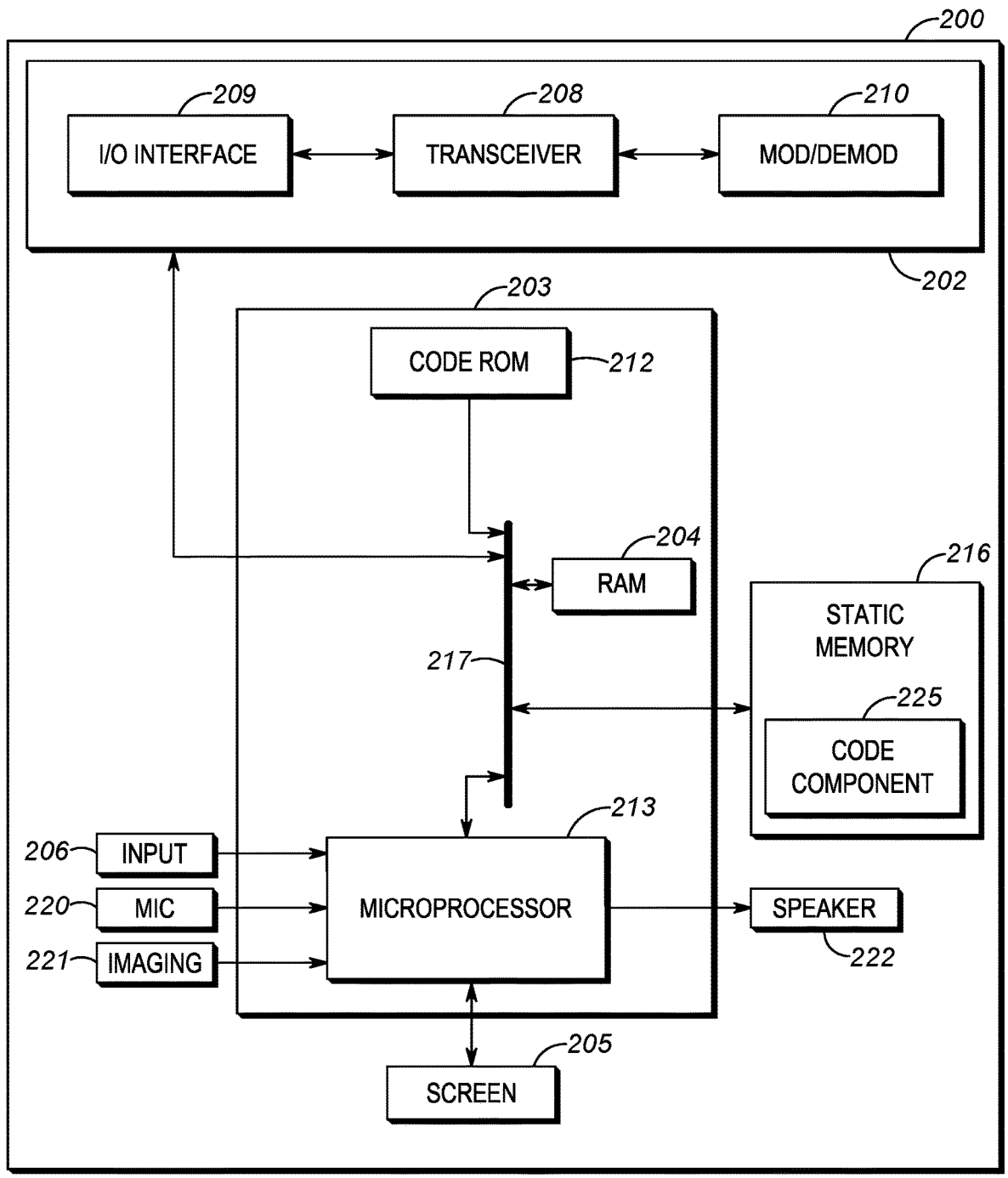
FIG. 2 is a device diagram showing a device structure of an electronic computing device employed in the system of FIG. 1 in accordance with some embodiment.

Now referring to FIG. 2, a schematic diagram illustrates an electronic computing device 200 according to some embodiments of the present disclosure. The electronic computing device 200 performs the functions of the electronic computing device 110 shown in FIG. 1, and may be embodied in one or more electronic media devices 120 that are associated with public-safety agencies, or some other communication device not illustrated in FIG. 1, and/or may be a distributed communication device across two or more of the foregoing (or multiple of a same type of one of the foregoing) and linked via a wired and/or wireless communication link(s), and may also be referred to herein as an electronic processing system.

While FIG. 2 may represent the devices as described above with respect to FIG. 1, depending on the type of the device, the electronic computing device 200 or other devices may include fewer or additional components in configurations different from that illustrated in FIG. 2. For example, in some embodiments, the electronic computing device 200 acting as an infrastructure controller may not include one or more of the screen 205, microphone 220, imaging device 221, and speaker 222. As another example, in some embodiments, the electronic computing device 200 acting as the radio communication device (e.g., electronic media device 120-1) may include one or more of the screen 205, microphone 220, imaging device, and a speaker 22. As still another example, in some embodiments, the electronic computing device 200 acting as the surveillance camera (e.g., electronic media device 120-2) may include one or more of the imaging device 221 and microphone 220, but may not include the screen, the user interface unit, and the speaker 222. Other combinations are possible as well.

As shown in FIG. 2, the electronic computing device 200 includes a communications unit 202 coupled to a common data and address bus 217 of a processing unit 203. The electronic computing device 200 may also include one or more input devices (for example, keypad, pointing device, touch-sensitive surface, button, a microphone 220, an imaging device 221, and/or a user input interface device 206) and an electronic display screen 205 (which, in some embodiments, may be a touch screen and thus also acts as an input device), each coupled to be in communication with the processing unit 203.

An audio and/or video capture device (microphone 220 and/or imaging device 221) is implemented at the electronic computing device 200 for capturing real-time digital audio and/or video stream from a user. For example, the microphone 220 may be present for capturing audio from a user (e.g., officer 140, user 142, user 144, etc.,) and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 provides video (still or moving images) of the electronic computing device 200 for further processing by the processing unit 203 and/or for further transmission by the communications unit 202. A speaker 222 may be present for reproducing audio that is decoded from voice or audio streams of calls received via the communications unit 202 from other portable radios, electronic media devices, from digital audio stored at the electronic computing device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the electronic media devices 120, smart building infrastructure device 150, and/or the incident database 160. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The one or more electronic processors 213 (also referred to herein as a microprocessor 213) has ports for coupling to the display screen 205, the microphone 220, the imaging device 221, the user input interface device 206, and/or the speaker 222. Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In one embodiment, the static memory 216 further includes incident database 160 and virtual-assistant deployment resources (e.g., a mapping of locations and correspondingly positioned electronic media devices and associated device capability information, authentication information, and virtual-assistant application data, and the like) to enable the electronic computing device 110 to deploy a virtual assistant at an identified electronic media device 120.

In examples set forth herein, the electronic computing device 200 is not a generic computing device, but a device specifically configured to implement functionality of deploying a virtual assistant at an electronic media device 120 to obtain information related to a public-safety incident. For example, in some embodiments, the electronic computing device 200 specifically comprises a computer executable engine configured to implement functionality of deploying a virtual assistant at an electronic media device 120 to obtain information related to a public-safety incident.

Figure 3:
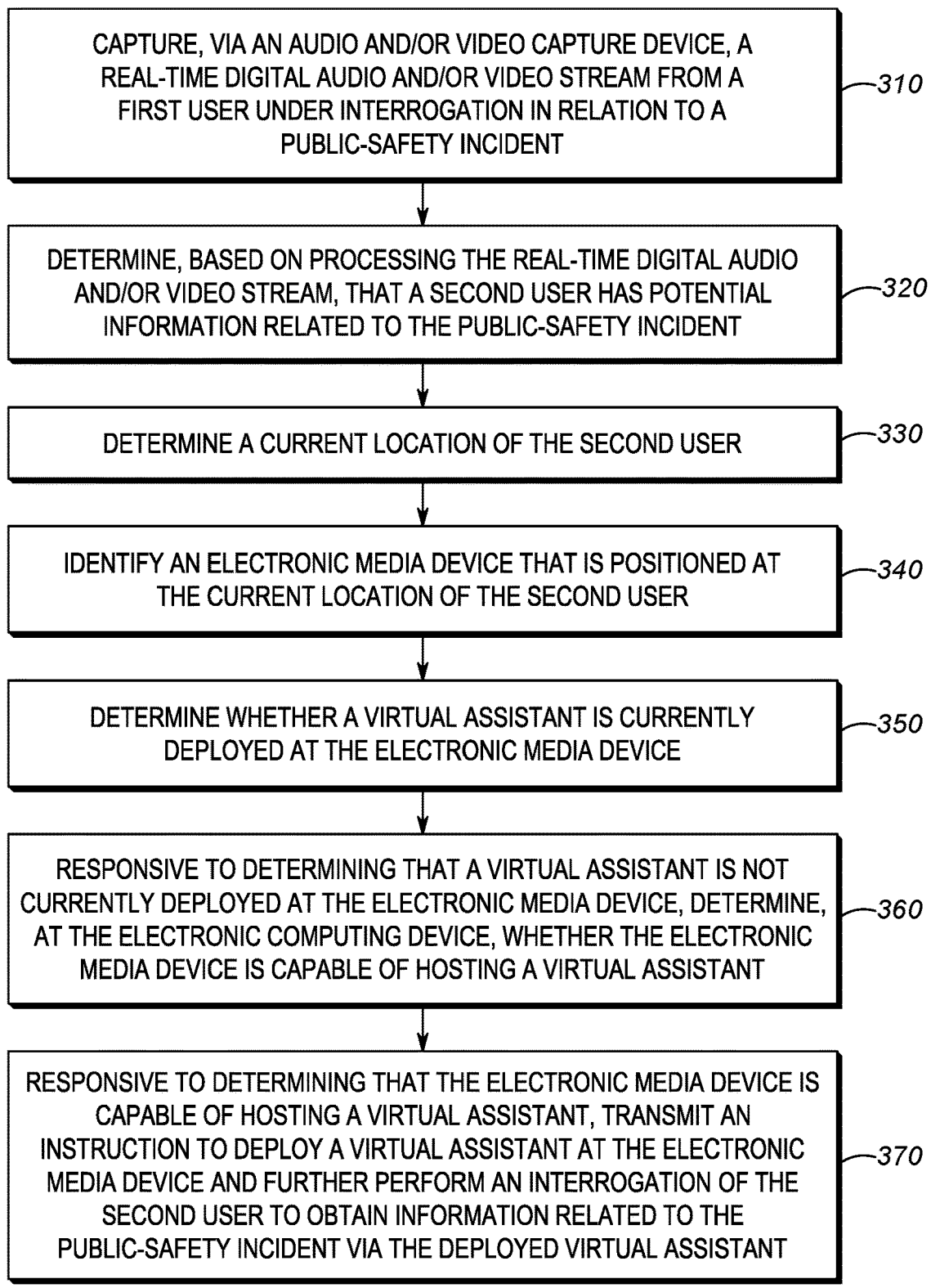
FIG. 3 illustrates a flow chart setting forth process blocks for deploying a virtual assistant at an electronic media device to obtain information related to a public-safety incident, in accordance with some embodiments.

Turning now to FIG. 3, a flowchart diagram in FIG. 3 illustrates a process 300 for deploying a virtual assistant at an electronic media device 120 to obtain information related to a public-safety incident. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A corresponding electronic computing device, such as the electronic computing device 110 of FIG. 1 and/or the electronic computing device 200 of FIG. 2, and embodied as a singular electronic computing device or distributed electronic computing device making up an electronic processing system as set forth earlier, may execute process 300. The electronic computing device may execute the process 300 at power-on, at some predetermined periodic time period thereafter, in response to a trigger raised locally at the device via an internal process or via an input interface (e.g., the user enabling a particular feature associated with the process 300 or the computing device detecting that the computing device has entered a particular area or that a user thereof has exited a particular area, among other possibilities), or in response to a trigger from one or more electronic media devices 120 operated by public-safety agencies to which the electronic computing device is communicably coupled, among other possibilities.

The process 300 of FIG. 3 need not be performed in the exact sequence as shown and likewise various blocks may be performed in different order or alternatively in parallel rather than in sequence. Accordingly, the elements are referred to herein as "blocks" rather than "steps." The process 300 may be implemented on variations of the system 100 of FIG. 1 as well.

Process begins at block 310 where the electronic computing device captures a real-time digital audio and/or video stream from a first user (e.g., user 142 of FIG. 1) under interrogation in relation to a public-safety incident. As one example, the electronic computing device may capture the audio and/or video stream via an integrated audio and/or video capture device (e.g., microphone 220 and imaging device 221 implemented at the electronic computing device 200) and/or via a wirelessly or wiredly coupled audio and/or video capture device (e.g., the externally deployed electronic media device 120-1 operating as the audio and/or video capture device). The electronic computing device may cause the audio and/or video capture device to start recording in response to a trigger event, or may begin processing an already-being-captured audio and/or video stream in response to the trigger event and in accordance with the subsequent processing steps set forth in the process 300. The trigger event may be generated in a number of ways and may be detected by the electronic computing device in a corresponding number of ways. As a first example, a government officer/interviewer such as the officer 140 shown in FIG. 1, may operate a user-interface of the electronic computing device corresponding to a request to begin capturing audio and/or video of an interviewee (e.g., user 142) under interrogation and the electronic computing device may subsequently detect a generated trigger event as a result of the user-interface manipulation. The user-interface may include a physical user-interface such as a physical or touch-sensitive button particularly assigned to an interviewee and that, when manipulated by the user, generates a trigger event, or may include an audio/video interface in which a spoken command to initiate recording or a particular hand gesture associated with a command to initiate recording is detected via an audio and/or video analysis of an audio/video stream capture processed at the electronic computing device.

As a second example, another electronic computing device or accessory device communicatively coupled to the electronic computing device, such as the radio communication device (i.e., electronic media device 120-1), may generate a trigger event (via a corresponding user interface or some other input or event detection) and transmit a corresponding instruction to the electronic computing device, such that, subsequent to receipt at the electronic computing device, causes the electronic computing device to detect the trigger event.

In any event, at block 310, the electronic computing device captures, via an audio and/or video capture device, electronic audio and/or video capture of a first user under interrogation in relation to a public-safety incident and stores the audio and/or video capture for further processing. The audio and/or video stream that is captured from the field-of-view of the first user may include an auditory record of questions that is asked by an interviewer. The term "interviewer" referred herein may indicate a human interviewer such as the officer 140 and/or an electronic virtual assistant that is deployed at one or more electronic media devices 120 (e.g., radio communication device operated by the officer 140) that are positioned at the location of the first user under interrogation in relation to a public-safety incident. Similarly, the audio and/or video stream that is captured from the field-of-view of the first user may include an auditory record of answers (to the question posed by the interviewer) obtained from the first user. Additionally, or alternatively, the audio and/or video stream may include a visual representation of sign-language or other visual communication system representative of questions asked by the interviewer, and visual representation of sign-language or other visual communication system representative of answers (to the questions posed by the interviewer) from an interviewee such as the first user. For example, when the interviewer poses a query to the first user asking the name of his/her friend who was present at the incident scene, the response from the first user may be verbally received and captured (e.g., via microphone 220) as an audio stream for further processing, or alternatively the response from the first user may correspond to a visual representation of sign-language or a hand-written note, that may be captured as a video stream (e.g., via imaging device 221) for further processing by the electronic computing device.

The captured audio and/or video stream may then be stored in non-volatile memory (e.g., static memory 216) at the electronic computing device. In some embodiments, the interviewer questions and interviewee answers (whether in audio or visual form) may be captured and stored at block 310 along with identifications of which auditory or visually captured content belongs to the interviewer and which auditory or visually captured content belongs to the interviewee. For example, an input interface at the electronic computing device or at the electronic media device 120-1 may be used by the interviewer (e.g., officer 140) to provide the electronic computing device an indication of which party is providing auditory or visual output of capture at any time, and the electronic computing device may process this information and store, integrated with the captured audio and/or video stream or via a separate associated metadata store, identification of the source (i.e., speaker) of each particular audio and/or video segment in the captured stream.

Alternatively, or additionally, the electronic computing device may apply a real-time or post process function that automatically distinguishes between interviewer questions and interviewee answers in the captured audio and/or video stream, again integrated within the captured audio and/or video stream or via a separate associated metadata store. For example, the interviewee may be identified via a video portion of the audio and/or video stream as one taking at least one or more action from a set of detectable actions or being in a detectable state associated with being an interviewee (such as being placed into a back seat of a police car, being handcuffed, having hands in the air or placed on a vehicle, taking a particular seat allocated to the interviewee in the interviewing room, etc.). In other examples, the interviewee may be identified via a video portion of the audio and/or video stream by a process of elimination in which a user, first responder, or officer having a known uniform or other clothing or unique visual feature (e.g., face) or auditory voice profile detectable via the video and/or audio is identified as the interviewer and eliminated from selection as the interviewee, for example, the remaining identified person being identified as the interviewee.

In other embodiments, an audio analysis function operating at the electronic computing device or at one of the electronic media devices 120 (e.g., radio communication device operated by the officer 140) may perform a voice recognition process on the captured audio portion of the audio and/or video stream. In these embodiments, the electronic computing device may compare the captured audio portion with a locally or remotely stored voice recognition database to identify the identity of the interviewer and/or interviewee.

Next, at block 320, the electronic computing device determines, based on processing the captured real-time digital audio and/or video stream captured from the first user, that a second user (e.g., user 144 and/or user 146 shown in FIG. 1) has potential information related to the public-safety incident. In accordance with some embodiments, the electronic computing device may process the captured real-time digital audio and/or video stream by converting the digital audio and/or video stream to a digital text string, which may include a text-based description of the audio and/or video from the audio and/or video stream captured from the first user. For example, the text-based description may correspond to the auditory record of answers (to the questions posed by the interviewer) provided by the first user and/or information provided by the officer 140. Additionally, or alternatively, the digital text stream may include text representative of the visual representation (e.g., sign language, hand written note etc.) of answers from the first user and/or information provided by the officer 140 during the interview. The electronic computing device may then parse the digital text string using a natural language processing (NLP) engine to determine whether the audio and/or video stream captured from the first user indicates that a second person has potential information related to the public-safety incident.

As an example, assume that the interviewee such as the first user is a witness to a public-safety incident such as a theft incident and further the first user indicates (e.g., via an auditory response to a query posed by the interviewer) during the interrogation that "My neighbor John and I saw a person running across the Main street with a bag. It was dark and I did not see his face clearly." The electronic computing device converts the verbal response captured from the first user into a digital text string. The electronic computing device then semantically processes the digital text string using the NLP engine, for example, to identify key terms and/or their relationships between one another. In one embodiment, processing the digital text string includes identifying one or more of nouns (including subjects and/or objects) and verbs in the digital text string, and generating a digital representation of their relationships. For example, the electronic computing device identifies that the digital text string includes key terms, "My neighbor John and I saw" and "I did not see his face clearly." Based on the above key terms and/or by processing audio and/or video stream captured from the first user using NLP algorithms, the electronic computing device determines that a second person "John" (e.g., user 144 or user 146 shown in FIG. 1) has potential information related to the theft incident. This determination may be based on the first user's information indicating that John has also witnessed the incident and it is possible that John might have clearly seen the face of the person running across the street. Accordingly, the electronic computing device may determine that John may be able to provide more details about the 'person' associated with the theft incident. In the above example, it is possible that the electronic computing device determines that more than one persons (e.g., users 144 and 146 shown in FIG. 1) have potential information related to the theft incident based on processing the real-time digital audio and/or video stream captured from the first user. In any case, at block 320, the electronic computing device processes the audio and/or video stream captured from the first user under interrogation in relation to a public-safety incident to determine that at least one other user has potential information related to the public-safety incident.

At block 330, the electronic computing device determines a current location of the second user (for example, current location of "John" as indicated by the first user during the interrogation). In accordance with some embodiments, the electronic computing device may access the incident database 160 to check if user profile information related to the second user (e.g., user 144 and/or user 146) is already available in the incident database 160. The user profile information, includes, but not limited to: (i) name of the person, (ii) address of the person, (iii) contact number of the person, (iv) incidents associated with the person (e.g., historical incident information such as arrest records, statements obtained from the witness, interview status etc.,), and (v) list of electronic media devices 120 (and device capability information) that are associated with the user (e.g., electronic media devices 120 carried or otherwise currently operated by the user and/or otherwise positioned in proximity to the user, for example, at a location in which the user is currently residing). If the user profile information corresponding to the second user is available in the incident database 160 and/or other governmental databases accessible to the electronic computing device, the electronic computing device may determine that the address indicated in the user profile corresponding to the second user is the current location of the second user. In other embodiments, when a mobile device operated by the second user is registered to share location information with the electronic computing device and/or an infrastructure controller associated with a public-safety agency, the electronic computing device may determine the current location of the second user based on the current location information shared by the mobile device associated with the second user. In these embodiments, the current location of the mobile device associated with the second user may be used a proxy for a current location of the second user.

At block 340, the electronic computing device identifies an electronic media device 120 that is positioned at the current location of the second user. In one embodiment, the electronic computing device accesses the second user's user profile information stored in the incident database 160 and/or other databases accessible to the electronic computing device to determine if there are one or more electronic media devices 120 that are positioned at the current location of the second user. In one embodiment, when the current location of the second user (e.g., user 144) corresponds to a location (e.g., location 132) which is under control of a public-safety agency, the electronic computing device may obtain a list of electronic media devices (e.g., electronic media device 120-2 positioned at the location 132 of the user 144) from an infrastructure device that is responsible for managing the electronic media devices 120 associated with a particular public-safety agency building/room. Alternatively, a mapping of locations and a list of correspondingly positioned electronic media devices 120 (for example, interviewing room at location 132 has a surveillance camera) may be stored at the static memory 216 and/or an external database that is accessible by the electronic computing device. In addition, the mapping may also include device capability information of the respective electronic media devices 120 that are positioned at the location of the second user.

In other embodiments, when the current location of the second user (e.g., user 146) corresponds to a location (e.g., location 134) which is not under control of a public safety agency, the electronic computing device may identify a smart building infrastructure device (e.g., device 150) associated with the current location of the second user and may further transmit a request to the smart building infrastructure device 150 (for example, via the communication link 178) to provide a list of one or more electronic media devices 120 that are positioned at the current location of the second user. In addition, the electronic computing device may also request the smart building infrastructure device 150 to provide device capability information associated with the one or more electronic media devices 120 that are positioned at the current location of the second user. In these embodiments, the electronic computing device may receive a response identifying a list of electronic media devices (e.g., electronic media devices 120-3 (i.e., smart speaker) and 120-4 (i.e., television)) that are positioned at the current location of the second user such as the user 146. In any case, at block 340, the electronic computing device identifies at least one electronic media device 120 that is positioned at the current location of the second user.

At block 350, the electronic computing device determines whether a virtual assistant is currently deployed at the identified electronic media device 120. In accordance with some embodiments, the electronic computing device may determine that the virtual assistant is currently deployed at the electronic computing device based on the second user's user profile information stored at the incident database 160. For example, the user profile information corresponding to the second user may identify one or more electronic media devices 120 (e.g., a smart speaker) that is pre-deployed with a virtual assistant to enable the electronic media device 120 to perform an interrogation of the second person to obtain information related to the public-safety incident. In other embodiments, when the user profile information does not include a list of electronic media devices 120 associated with the second user, the electronic computing device may send a request to a smart building infrastructure device (e.g., smart building infrastructure device 150) associated with the current location of the second person to indicate whether a virtual assistant is pre-deployed at the electronic media device 120. In some embodiments, the electronic computing device may automatically determine based on device capability information stored in the user profile information and/or device capability information obtained from the smart building infrastructure device 150 to determine whether a virtual assistant is pre-deployed at the identified electronic media device 120. For example, the device capability information may indicate whether a virtual-assistant application is already installed at a particular electronic media device. In some embodiments, the electronic media device 120 may have an installed virtual-assistant application, but the virtual assistant application may not be configured with necessary incident context information and/or security credentials to enable the virtual assistant to pose incident-related questions and/or process incident relation responses (corresponding to the public-safety incident for which the first user is under interrogation) obtained from the second user. In these embodiments, the electronic computing device may perform the functions associated with blocks 360 and 370 even when the electronic media device 120 is already pre-deployed with a virtual assistant. In other embodiments, a pre-deployed virtual assistant may be already configured to extract incident context information from the incident database 160 to autonomously generate and pose incident-related queries to the second user (e.g., via a speaker component of the electronic media device 120) and further capture responses (e.g., via an audio and/or video capture device associated with the electronic media device 120) provided by the second user. In these embodiments, the electronic computing device 110 may refrain from performing the function associated with block 360 and may instead directly proceed to block 370 to transmit an instruction to the identified electronic media device 120 to perform an interrogation of the second user and to obtain information related to the public-safety incident via the pre-deployed virtual assistant. As used herein, the term "interrogation' refers to a process performed by a virtual assistant to autonomously pose incident-related queries to a user and further process a response captured from the user with the goal of obtaining information related to a public-safety incident for which the virtual assistant is programmed to be deployed at an identified electronic media device 120.

When the electronic computing device determines that a virtual assistant is not currently deployed at the identified electronic media device 120, the electronic computing device, at block 360, determines whether the identified electronic media device 120 is capable of hosting a virtual assistant. In accordance with some embodiments, the electronic computing device may access the device capability information associated with the electronic media device 120 to determine whether the electronic media device 120 is capable of hosting a virtual assistant. The device capability information associated with the electronic media device 120 may be accessed from the user profile information stored at the incident database 160 or alternatively obtained from the smart building infrastructure device 150 that is responsible for managing the identified electronic media device 120 that is positioned at the current location of the second user. The device capability information includes, but is not limited to: (i) available input and/or output devices (e.g., display, speaker, microphone, keyboard) associated with the electronic media device 120, (ii) available memory, (iii) audio and/or video input and/or output capability, (iv) processing power, (v) network capability/available bandwidth and (vi) operating system. Other software and/or hardware capabilities of the electronic media device 120 may also be included in the device capability information. In accordance with some embodiments, the electronic computing determines that the electronic media device 120 is capable of hosting a virtual assistant when the device capability information associated with the electronic media device 120 indicates that the electronic media device 120 is capable of performing one or more virtual-assistant functions associated with interrogating the second user. For example, based on the audio and/or video stream captured from the first user, the electronic computing device may determine that a virtual assistant needs to be deployed at the current location of the second user to perform a virtual-assistant function of interrogating the second user by autonomously posing an audio-based query to the second user and further capturing an audio-based response from the second user. In this example, the electronic computing device may check whether the electronic media device 120 positioned at the current location of the second user includes a speaker and microphone component to support the virtual-assistant function of posing audio-based queries to the second user and further capturing audio-based responses from the second user. Additionally, or alternatively, the electronic computing device may determine that the virtual-assistant function of interrogating the second user involves displaying an image and/or video (e.g., to display a captured image of a suspect in connection with the theft incident) to the second user in order to obtain an audio and/or visual response from the second person (e.g., to obtain a response indicating whether the second person recognizes the face of the person associated with the theft incident). In this case, the electronic computing device may require that the electronic media device 120 positioned at the current location of the second user is associated with a display device (e.g., electronic media device 120-4 corresponding to a television) that provides image and/or video streaming capability. As another example, the electronic computing device may determine that deploying a virtual assistant at the electronic media device 120 requires an installation of a software application at the electronic media device 120. The device capability information associated with the identified electronic media device 120 may indicate that an operating system of the electronic media device 120 may not support the file format of the virtual-assistant application to be installed or alternatively it may indicate that the current memory space available at the electronic media device 120 is less than memory space required for the installation of the virtual-assistant application. The electronic computing device may determine that the electronic media device 120 is not capable of hosting a virtual assistant when the virtual-assistant function and/or installation of the software application associated with the virtual assistant cannot be performed at the electronic media device 120 based on the device capability information associated with the identified electronic media device 120. In this case, the electronic computing device identifies a second electronic media device 120 positioned at the location of the second user that is capable of hosting a virtual-assistant, and further transmits an instruction to deploy a virtual assistant at the second electronic media device 120 as shown at block 370.

In accordance with some embodiments, when there are more than one electronic media device 120 that are identified (at block 340) as positioned at the current location of the second user, the electronic computing device performs the functions associated with blocks 350 and 360 for each of the electronic media device 120 identified at block 340. In these embodiments, the electronic computing device may either select one electronic media device 120 or more than one electronic media device 120 (based on associated device capability information) from the plurality of electronic media devices 120 positioned at the current location of the second user for the purposes of transmitting an instruction to deploy a virtual assistant at the selected electronic media device(s) 120 as shown at block 370.

When it is determined at block 360 that the electronic media device 120 is capable of hosting a virtual assistant, the electronic computing device proceeds to block 370 to transmit an instruction to deploy a virtual assistant at the electronic media device 120 and further perform an interrogation of the second user to obtain information related to the public-safety incident from the second user via the deployed virtual assistant. In one embodiment, the electronic computing device transmits the instruction to a smart building infrastructure device 150 to deploy a virtual assistant at the selected electronic media device 120. In this embodiment, the smart building infrastructure device acts 150 as a communication conduit by authenticating the electronic computing device and validating all electronic messages exchanged between the electronic computing device and the electronic media device 120 for the purposes of deploying the virtual assistant at the electronic media device 120 and/or communicating the information obtained from the second user during interrogation by the deployed virtual assistant. In other embodiments, the electronic computing device may transmit an instruction directly to the electronic media device 120 to deploy a virtual assistant at the electronic media device 120. When the electronic media device 120 is managed by a smart building infrastructure device 150, the electronic computing device, prior to transmitting an instruction to the electronic media device 120 to deploy a virtual assistant, transmits a request to the smart building infrastructure to provide permission to deploy a virtual assistant at the electronic media device. The request to provide permission may further include authentication information (e.g., a digital certificate) associated with the electronic computing device. In response to the request, the smart building infrastructure may check whether the electronic computing device is authorized (e.g., by a governmental agency) to deploy a virtual assistant at a remote electronic media device 120 and may further send a response providing permission to deploy a virtual assistant at the electronic media device 120 when the authentication information provided by the electronic computing device is valid. The smart building infrastructure device 150 may verify, for example, by communicating with a trusted computer server associated with the governmental agency, that the authentication information provided by the electronic computing device is valid. In some embodiments, when the authentication information associated with the electronic computing is determined to be valid, the smart building infrastructure device 150 may send a response message providing permission to the electronic computing device to deploy a virtual assistant at the electronic media device 120. Additionally, the smart building infrastructure device 150 may also send a message indicating to the electronic media device 120 (for example, to electronic media device 120-3, via the communication link 174) that the electronic computing device has permissions to deploy a virtual assistant at the electronic media device 120. An address or identifier of the electronic computing device may be included in this message to enable the electronic media device 120 to validate any message (e.g., a received request to deploy a virtual assistant and/or perform an interrogation of the user) subsequently received at the electronic media device 120 from the electronic computing device.

In any case, when the response indicating permission to deploy a virtual assistant is received from the smart building infrastructure device 150, the electronic computing device transmits an instruction (directly or via the smart building infrastructure device 150) to the electronic media device 120 to deploy a virtual assistant at the electronic computing device. In accordance with some embodiments, the instruction received from the electronic computing device includes (i) authentication information associated with the electronic computing device and (ii) virtual-assistant application data. The authentication information associated with the electronic computing device may include credentials of the electronic computing device, for example, a digital certificate provided by a governmental agency which is responsible for regulating and controlling the deployment of virtual assistants at authorized electronic media devices 120. The electronic media device 120 may communicate with the smart building infrastructure device 150 and/or a trusted server associated with the governmental agency to validate the authenticity (i.e., to deploy a virtual assistant at the electronic media device) of the electronic computing device based on the authentication information included in the instruction. The virtual-assistant application data includes installation program to enable the electronic media device 120 to install a virtual-assistant application from the virtual-assistant application data at the electronic media device 120. In other embodiments, the virtual-assistant application data may include an address of a network resource (e.g., incident database 160) from which the virtual-assistant application program can be accessed for installing the virtual-assistant application. In accordance with some embodiments, the virtual-assistant application data further includes incident data, for example, incident data related to the theft incident, that allows the virtual assistant to be programmed to interrogate the second user in relation to a specific public-safety incident that is associated with the incident data. The incident data may include incident context information or address to a resource (e.g., incident database 160) from which the incident context information can be extracted for programming/configuring the virtual assistant to generate specific incident-related queries and/or process responses captured from the second person. The incident context information may include text, video, or audio data that are previously obtained in relation to the public-safety incident for which the second user (e.g., user 146) is to be interrogated. For example, the incident context information may include one or more of: (i) identity of the second user; (ii) information obtained from the first user (e.g., user 142) during interrogation by a virtual assistant deployed at the electronic media device 120 positioned at the first location 130 and/or by an interviewer such as the officer 140; and (iii) information extracted from an incident record stored at the incident database 160 corresponding to the public-safety incident, for example, an identifier of the incident, location of the incident, type and severity level of the incident, incident priority, user profiles of officers assigned to the incident, user profiles of witnesses and suspects, officer reports, conversations between officers in the talk group, and testimonies/statements of witnesses and suspects. The incident data may additionally include authentication keys (e.g., temporary keys that are valid only for a time period set by the electronic computing device) that allows the electronic media device 120 to access incident context information from one or more incident records (stored at the incident database 160) associated with the public-safety incident.

In accordance with embodiments, responsive to processing the instruction (including the authentication information associated with the electronic computing device and virtual-assistant application data) received from the electronic computing device, the smart building infrastructure device 150 and/or electronic media device 120 performs a virtual-assistant deployment procedure by installing the virtual-assistant application from the virtual-assistant application data at the electronic media device 120 and further configuring the installed virtual-assistant application with incident context information corresponding to a public-safety incident for which the second user is to be interrogated to obtain information related to the public-safety incident. For example, in the example described with reference to block 310 in relation to the theft incident, the virtual assistant may be configured with the incident context information associated with the theft incident to generate an audio query indicating "Mr. John, did you witness the person running across the Main Street with a bag." The audio query may be played via a smart speaker (i.e., electronic media device 120-3) and additionally or alternatively, an image or a text message corresponding to the audio query may be displayed via a television (i.e. electronic media device 120-4) at the location 134. The second person may provide an audio response indicating "Yes, I witnessed the incident." The audio response may be captured via a microphone component associated with the smart speaker and may be further processed by the virtual assistant deployed at the smart speaker. The virtual assistant deployed at the electronic media device 120-3 and/or 120-4 may process the captured audio response using NLP engine and may further generate a new audio query indicating "Mr. John, do you recognize the person." In this case, the virtual assistant may also additionally display an image of a suspect (e.g., an image captured by a surveillance camera deployed at the incident scene) via the television. In response, the audio response captured from the second user may indicate "No, I do not know or recognize the person." The virtual assistant may also generate an additional query indicating "Mr. John, did you notice the color of the bag carried by the person." In response, the second person may indicate "Yes, I remember it is a brown bag." In any case, the virtual assistant deployed at one or more electronic media devices 120 positioned at the current location of the second user generates and poses incident-related queries based on responses captured from the second user as a function of the incident context information associated with the public-safety incident for which the second user is interrogated.

The information obtained from the second user corresponds to one or more of text, audio, or video response captured from the second user by the virtual assistant deployed at the electronic media device 120 in response to one or more queries posed by the virtual assistant via the electronic media device 120 based on the incident context information associated with the public-safety incident. In accordance with some embodiments, the virtual assistant deployed at the electronic media device 120 may process the responses captured from the second person (for example, by converting the response to a digital text string and then semantically processing the digital text string) and may further transmit the responses (for example, as a text, audio, or video representative of the queries posed to the second user by the virtual assistant and/or further representative of the answers provided by the second user to the virtual assistant) in real-time from the electronic media device 120 to the electronic computing device (directly or via the smart building infrastructure device 150). Additionally, or alternatively, the virtual assistant also updates the incident record (e.g., incident record identified by the identifier of the theft incident) at the incident database 160 to include new information (e.g., the color of the bag is brown) obtained from the second person during interrogation by the deployed virtual assistant.

In accordance with some embodiments, the virtual assistant deployed at the electronic media device 120 positioned at the current location (e.g., location 134) of the second user (e.g., user 146) may process the information (e.g., real-time digital audio or video stream captured via device 120-3 and/or 120-4, during interrogation of the second user) obtained from the second user to determine that a third user (e.g., user 144) has potential information related to the public-safety incident. In response to this determination, the electronic media device 120 may execute the functions shown in process 300 (i.e., blocks 330-370). For example, the electronic media device 120 positioned at the current location of the second user determines a current location (i.e., location 132) of the third user, identifies an electronic media device 120 (e.g., electronic media device 120-2) that is positioned at the current location of the third user, and transmits an instruction to deploy a virtual assistant at the electronic media device 120 positioned at the current location of the third user and further to perform an interrogation of the third user to obtain information related to the public-safety incident via the virtual assistant deployed at the electronic media device of the third user. Similarly, the information obtained from the third user is then sent to the electronic media device 120 positioned at the second user or to the electronic media device 120 (e.g., electronic media device 120-1) positioned at the current location (e.g., location 130) of the first user (e.g., user 142). In these embodiments, the request to deploy virtual assistant and perform interrogation of additionally identified users (i.e., to perform process 300) may be propagated in a similar manner to other electronic media devices in real-time when it is determined that additionally identified users have potential information related to the public-safety incident for which the first user is under interrogation.

In accordance with some embodiments, the electronic computing device may send separate instructions to deploy virtual assistants at more than one identified electronic computing device, for interrogating different users in relation to the same public-safety incident. For example, in the example shown in FIG. 1, the electronic computing device sends a first instruction to the electronic media device 120-2 positioned at the location 132 to deploy a virtual assistant at the electronic media device 120-2 and further perform interrogation of user 144 in relation to the public-safety incident, for which the user 142 is being interrogated at location 130. Similarly, the electronic computing device also sends a second instruction to the smart building infrastructure device 150 to deploy a virtual assistant at one or more of the electronic media devices 120-3, 130-4 that are positioned at the location 134 to perform interrogation of user 146 in relation to the public-safety incident, for which the user 142 is being interviewed at location 130. In these embodiments, the electronic computing device may also request a virtual assistant deployed at one electronic media device (e.g., electronic media device 120-3 positioned at location 134) to update its incident context information based on new incident-related information obtained by the virtual assistant deployed at another electronic media device (e.g., electronic media device 120-2 positioned at location 132). In this case, the virtual assistant deployed at electronic media 120-3 may pose new queries to the user 144 and/or process the responses received from the user 144 based on the updated context information. In these embodiments, when there is a plurality of virtual assistants that are deployed at different locations for interrogating different users for a common public-safety incident, the electronic computing device may establish an ad-hoc virtual assistant network to enable the virtual assistants to securely exchange information related to the common incident with each other via the virtual assistant network in real-time. In accordance with some embodiments, an ad-hoc virtual-assistant network allows all virtual assistants that are deployed for the purpose of obtaining information related to a common public-safety incident to securely exchange information obtained from respective users during their respective interrogations and to further update incident context information at respective virtual assistants. For example, a first virtual assistant may learn the color of the bag carried by the person associated with theft incident and may share this information in real-time to other virtual assistants via the virtual assistant network. Other virtual assistants receiving this information may update their respectively configured incident context information (for example, to include the color of the bag carried by the person associated with the theft incident) and may further generate new queries and/or process responses received from the respective users during their respective interrogations based on the updated incident context information. In these embodiments, a particular virtual assistant may be disconnected from the virtual-assistant network if the particular virtual assistant has completed (e.g., by sending the information obtained from the second user to the electronic computing device and/or other virtual assistants in the virtual assistant network or storing the information at the incident database 160) the virtual-assistant function associated with interrogating the second user.

In one embodiment, the smart building infrastructure device 150 may select particular one or more electronic media devices 120 positioned at a given location of the user based on the respective device capability information associated with the electronic media devices 120. For example, responsive to receiving an instruction to deploy a virtual assistant at an electronic media device 120 positioned at the location 134, the smart building infrastructure device 150 may determine to deploy the virtual assistant at the smart speaker when the device capability information associated with the smart speaker indicates that the smart speaker (i.e., electronic media device 120-3) is capable of capturing an audio response received from the user 146 and further when the incident context information included in the instruction received from the electronic computing device indicates that an audio response from the user 146 is required. In this example, the smart building infrastructure device 150 may determine to not deploy the virtual assistant at the television (i.e. electronic media device 120-4) when the device capability information associated with the television does not indicate that the television is not capable of receiving and/or processing audio inputs from the user.

In one embodiment, the smart building infrastructure device 150 may combine the capabilities of more than one electronic media device 120 to perform the virtual-assistant function of interrogating a user in relation to a public-safety incident. For example, the device capability information associated with the smart speaker (i.e., electronic media device 120-1) may indicate that the smart speaker device includes a microphone component for capturing audio from user and further there is no display device associated with the smart speaker, and the device capability information associated with the television may indicate availability of display device, but not the microphone component for capturing audio from user. In this case, when the instruction from the electronic computing device indicates that the virtual-assistant interrogation function involves both audio capturing function as well as display function, the deployed virtual assistant may be programmed to perform audio capturing function (e.g., to capture an audio input from the user 146) via the smart speaker device and further perform display function (e.g., to display an image of a suspect associated with an incident) via the television.

In one embodiment, the incident context information included in the instruction to deploy a virtual assistant at the electronic media device also includes a list of specific queries to be posed to the second user and/or a list of specific information to be obtained from the second user in connection with the public-safety incident. Accordingly, when the virtual assistant determines that the second user has responded to all specific queries and/or provided all specific information requested by the electronic computing device, the virtual assistant, after transmitting the information obtained from the second user to the electronic computing device and/or storing the information at the incident database 160, may request the electronic media device 120 and/or the smart building infrastructure device 150 to perform a procedure to un-deploy the virtual assistant deployed at the electronic computing by de-configuring the virtual-assistant application data such as the incident context information that is programmed into the virtual assistant and further by uninstalling the virtual-assistant application at the electronic media device 120. In other embodiments, the electronic computing device, in response to receiving a response including information obtained from the second user during interrogation by the deployed virtual assistant, processes the information to verify if the information included in the response is complete with respect to the list of queries posed to the second user and/or responses (including specific information as requested by the electronic computing device) captured from the second user. If the information included in the response is determined to be complete, the electronic computing device may store the received response at the incident database 160 and may send a separate instruction to the smart building infrastructure device 150 or the electronic media device 120 to un-deploy the virtual assistant at the electronic media device 120. Alternatively, when the information included in the response is determined to be not complete, for example, when no response from the user has been detected and/or recorded, the electronic computing device may store a record of queries not answered by the second user, for example, at the incident database 160. In addition, the electronic computing device may recommend a follow-up action (e.g., an action requiring human intervention such as requesting the officer 140 to manually call the second user or travel to a location of the second user or to deploy a virtual assistant at an electronic media device positioned at a location of a third user to obtain the same information from the third user) to be performed to obtain the incident-related information. In other embodiments, the procedure to un-deploy a virtual assistant deployed at the electronic media device 120 may be performed by the electronic media device 120 and/or the smart building infrastructure device 150 automatically based on expiry of the security certificates installed at the electronic media device 120 for the purpose of interrogating the second user or alternatively based on expiry of other timers defined in the instruction received from the electronic computing device to deploy a virtual assistant.

In accordance with some embodiments, the instruction from the electronic computing device to deploy a virtual assistant at the electronic media device 120 further includes information related to incident and/or interrogation priority. The interrogation priority information enables the electronic media device 120 and/or the smart building infrastructure device 150 to determine whether to prioritize a request to deploy a virtual assistant and/or perform interrogation for a particular incident over another incident. In some cases, the electronic media device 120 and/or the smart building infrastructure device 150 may receive instruction from more than one electronic computing device and/or for obtaining information related to more than one public-safety incident. In these cases, the electronic computing device identifies the interrogation priority information included in the instructions respectively received from different electronic computing devices and/or for different public safety incidents, and further prioritizes a particular instruction (i.e., to prioritize allocation/re-allocation of electronic media resources for deployment of virtual assistant and/or to perform interrogation of the user) if the interrogation priority information associated with the particular interrogation indicates a higher priority level than respective priority levels indicated by the interrogation priority information associated with other instructions.

In accordance with embodiments described herein, systems, devices, and methods disclosed herein can be advantageously employed to deploy virtual assistants in real-time at capable electronic media devices located at remote locations to automatically obtain information related to public safety incidents from users located at such remote locations. Virtual assistants deployed at such electronic media devices are configured with incident context information and necessary security credentials to enable the virtual assistants to autonomously perform interrogation of the users by posing incident-related questions to users and further processing responses captured from users based on the incident context. Such dynamic deployment of virtual assistants at electronic media devices positioned at remote locations based on audio and/or video stream of responses captured from users at another location allows investigating officers to be focused on their current tasks while virtual assistants obtain real-time incident related information from users located at remote locations, thereby resulting in improved information gathering and reduced time spent with traveling and/or manually interviewing each user in possession of incident related information. Accordingly, the embodiments described herein can be integrated into a practical application that further provides for a technical solution to obtain incident related information in real-time from users located in remote locations by means of deploying virtual-assistants at capable electronic media devices positioned in proximity to such users.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of deploying a virtual assistant at an electronic media device for obtaining information related to a public-safety incident, the method comprising:
   capturing, at an electronic computing device, via an audio and/or video capture device, a real-time digital audio and/or video stream from a first user under interrogation in relation to a public-safety incident;
   determining, at the electronic computing device, based on processing the real-time digital audio and/or video stream captured from the first user, that a second user has potential information related to the public-safety incident;
   determining, at the electronic computing device, a current location of the second user;
   identifying, at the electronic computing device, an electronic media device that is positioned at the current location of the second user;
   determining, at the electronic computing device, whether a virtual assistant is currently deployed at the electronic media device;
   responsive to determining that a virtual assistant is not currently deployed at the electronic media device, determining, at the electronic computing device, whether the electronic media device is capable of hosting a virtual assistant; and
   responsive to determining that the electronic media device is capable of hosting a virtual assistant, transmitting, at the electronic computing device, an instruction to deploy a virtual assistant at the electronic media device and further perform an interrogation of the second user to obtain information related to the public-safety incident from the second user via the deployed virtual assistant.

2. The method of claim 1, wherein determining that the second user has potential information related to the public-safety incident, comprises:
   converting the real-time digital audio and/or video stream captured from the first user into a digital text string; and
   semantically processing the digital text string to identify one or more key terms indicating that the second user has potential information related to the public-safety incident.

3. The method of claim 1, wherein the instruction includes virtual-assistant application data to enable the electronic media device to deploy a virtual assistant by installing a virtual-assistant application from the virtual-assistant application data at the electronic media device and configuring the installed virtual-assistant application with incident context information associated with the public-safety incident.

4. The method of claim 3, wherein the incident context information includes identity of the second user, information obtained from the first user corresponding to the public-safety incident, and information extracted from an incident record corresponding to the public-safety incident, wherein the incident context information enables the virtual assistant deployed at the electronic media device to pose incident-related queries to the second user and process response captured from the second user as a function of the incident context information.

5. The method of claim 4, further comprising:
   responsive to deploying the virtual assistant at the electronic media device, receiving, at the electronic computing device, information related to the public-safety incident from the electronic media device, wherein the information corresponds to one or more of text, audio, or video response captured from the second user by the deployed virtual assistant in response to one or more queries posed by the deployed virtual assistant via the electronic media device based on the incident context information.

6. The method of claim 5, further comprising:
responsive to receiving information related to the public-safety incident from the electronic media device, transmitting an instruction to the electronic media device to un-deploy the virtual assistant at the electronic media device, wherein un-deploying the virtual assistant includes uninstalling the virtual-assistant application from the electronic media device.

7. The method of claim 5, further comprising:
determining, based on processing the information received from the electronic media device, that a third user has potential information related to the public-safety incident;
determining, at the electronic computing device, a current location of the third user;
identifying, at the electronic computing device, a second electronic media device that is positioned at the current location of the third user;
determining, at the electronic computing device, whether a virtual assistant is currently deployed at the second electronic media device;
responsive to determining that a virtual assistant is not currently deployed at the second electronic media device, determining, at the electronic computing device, whether the second electronic media device is capable of hosting a virtual assistant; and
responsive to determining that the second electronic media device is capable of hosting a virtual assistant, transmitting, at the electronic computing device, a second instruction to deploy a virtual assistant at the second electronic media device and further perform an interrogation of the third user to obtain information related to the public-safety incident from the third user via the virtual assistant deployed at the second electronic media device.

8. The method of claim 3, wherein the instruction further includes authentication information associated with the electronic computing device to enable the electronic media device to verify the authenticity of the electronic computing device prior to the installation of the virtual-assistant application.

9. The method of claim 3, wherein the instruction further includes a security certificate for the electronic media device to enable the electronic media device to connect to an incident database in which the incident context information associated with the public-safety incident is stored.

10. The method of claim 3, wherein the incident context information indicates an interrogation priority associated with the public-safety incident, the interrogation priority enabling the electronic media device to prioritize allocation of electronic media device resources for the deployment of the virtual assistant at the electronic media device in accordance with the interrogation priority indicated in the incident context information.

11. The method of claim 1, wherein identifying the electronic media device comprises:
identifying a smart building infrastructure device that manages one or more electronic media devices that are positioned at the current location of the second user;
transmitting, to the smart building infrastructure device, a request to provide a list of electronic media devices and device capability information associated with the respective electronic media devices that are positioned at the current location of the second user; and
receiving, from the smart building infrastructure device, a list of one or more electronic media devices and device capability information associated with the respective one or more electronic media devices, wherein the identified electronic media device corresponds to one of the one or more electronic media devices included in the list.

12. The method of claim 1, wherein determining whether the electronic media device is capable of hosting the virtual assistant comprises:
accessing device capability information associated with the electronic media device;
identifying one or more virtual-assistant functions associated with performing interrogation of the second user based on incident context information associated with the public-safety incident; and
determining that the electronic media device is capable of hosting a virtual assistant when the device capability information associated with the electronic media device indicates that the electronic media device is capable of performing the identified one or more virtual-assistant functions.

13. The method of claim 1, further comprising:
responsive to determining that the identified electronic media device is not capable of hosting a virtual assistant, identifying at least one other electronic media device that is positioned at the current location of the second user;
accessing device capability information associated with the at least one other electronic media device;
identifying one or more virtual-assistant functions associated with performing interrogation of the second user based on incident context information associated with the public-safety incident;
determining that the at least one other electronic media device is capable of hosting a virtual assistant when the device capability information associated with the at least one other electronic media device indicates that the electronic media device is capable of performing the identified one or more virtual-assistant functions; and
transmitting a second instruction to deploy a virtual assistant at the at least one other electronic media device and further perform an interrogation of the second user to obtain information related to the public-safety incident from the second user via the virtual assistant deployed at the at least one other electronic media device.

14. The method of claim 1, wherein prior to transmitting the instruction to deploy the virtual assistant at the electronic media device, the method further comprising:
identifying a smart building infrastructure device that manages the electronic media device that is positioned at the current location of the second user;
transmitting a request to the smart building infrastructure device to provide permission to deploy a virtual assistant at the electronic media device; and
receiving, from the smart building infrastructure device, a permission to deploy the virtual assistant at the electronic media device.

15. The method of claim 14, wherein the request includes authentication information associated with the electronic computing device to enable the smart building infrastructure device to verify the authenticity of the electronic computing device prior to providing the permission to deploy the virtual assistant at the electronic media device.

16. An electronic processing system, comprising:
an audio and/or video capture device;
a transceiver;
one or more electronic processors communicatively coupled to the audio and/or video capture device and the transceiver, the one or more electronic processors configured to:
capture, via the audio and/or video capture device, a real-time digital audio and/or video stream from a first user under interrogation in relation to a public-safety incident;
determine, based on processing the real-time digital audio and/or video stream captured from the first user, that a second user has potential information related to the public-safety incident;
determine a current location of the second user;
identify an electronic media device that is positioned at the current location of the second user;
determine, at the electronic computing device, whether a virtual assistant is currently deployed at the electronic media device;
when it is determined that a virtual assistant is not currently deployed at the electronic media device, determine, at the electronic computing device, whether the electronic media device is capable of hosting a virtual assistant; and
when it is determined that the electronic media device is capable of hosting a virtual assistant, transmit, via the transceiver, an instruction to deploy a virtual assistant at the electronic media device and further perform an interrogation of the second user to obtain information related to the public-safety incident from the second user via the deployed virtual assistant.

17. The electronic processing system of claim 16, wherein the one or more electronic processors are configured to:
convert the real-time digital audio and/or video stream captured from the first user into a digital text string; and
semantically process the digital text string to identify one or more key terms indicating that the second user has potential information related to the public-safety incident.

18. The electronic processing system of claim 16, wherein the instruction includes virtual-assistant application data to enable the electronic media device to deploy a virtual assistant by installing a virtual-assistant application from the virtual-assistant application data at the electronic media device and configuring the installed virtual-assistant application with incident context information associated with the public-safety incident.

19. The electronic processing system of claim 18, wherein the incident context information includes identity of the second user, information obtained from the first user corresponding to the public-safety incident, and information extracted from an incident record corresponding to the public-safety incident, wherein the incident context information enables the deployed virtual assistant to pose incident-related queries to the second user and process response captured from the second user as a function of the incident context information.

20. The electronic processing system of claim 18, wherein the one or more electronic processors are configured to:
receive, via the transceiver, information related to the public-safety incident from the electronic media device, wherein the information corresponds to one or more of: text, audio, or video response captured from the second user by the deployed virtual assistant in response to one or more queries posed by the deployed virtual assistant via the electronic media device based on the incident context information.

* * * * *